United States Patent [19]

Ishikawa

[11] Patent Number: 5,636,034

[45] Date of Patent: Jun. 3, 1997

[54] DATA TRANSMITTING/RECEIVING APPARATUS OPERATING IN A USER-SELECTED ONE OF A LINE SPECIFYING MODE AND A FREE-LINE SEARCHING MODE

[75] Inventor: Seiichi Ishikawa, Ebina, Japan

[73] Assignee: Ricoh Company, Ltd., Tokyo, Japan

[21] Appl. No.: 476,579

[22] Filed: Jun. 7, 1995

[30] Foreign Application Priority Data

Jun. 10, 1994 [JP] Japan .................................. 6-128407

[51] Int. Cl.⁶ .............................. H04N 1/00; H04N 1/32
[52] U.S. Cl. ........................ 358/434; 358/468; 379/100; 379/98; 379/93
[58] Field of Search ................................. 358/442, 468, 358/434, 440, 435, 439, 400; 379/100, 98, 93, 97; H04N 1/32

[56] References Cited

U.S. PATENT DOCUMENTS

| | | | |
|---|---|---|---|
| 4,785,355 | 11/1988 | Matsumoto | 379/100 |
| 4,825,461 | 4/1989 | Kurita et al. | 379/100 |
| 5,042,028 | 8/1991 | Ogawa | 379/100 |
| 5,055,945 | 10/1991 | Oguma et al. | 358/468 |
| 5,056,133 | 10/1991 | Iida | 379/98 |
| 5,134,502 | 7/1992 | Nakatsuma | 358/434 |
| 5,170,266 | 12/1992 | Marsh et al. | 358/468 |
| 5,278,665 | 1/1994 | Sawada et al. | 358/434 |
| 5,363,206 | 11/1994 | Fukushima | 358/444 |
| 5,377,016 | 12/1994 | Kashinagi et al. | 358/444 |
| 5,418,625 | 5/1995 | Shimoosawa | 358/434 |
| 5,428,457 | 6/1995 | Okumura et al. | 358/403 |
| 5,442,457 | 8/1995 | Najafi | 379/100 |

FOREIGN PATENT DOCUMENTS 29344   7/1987   Japan ...................... H04L 11/20

Primary Examiner—Kim Vu
Assistant Examiner—Fan Lee
Attorney, Agent, or Firm—Oblon, Spivak, McClelland, Maier & Neustadt, P.C.

[57] ABSTRACT

A transmitting/receiving unit performs a plurality of data transmission operations and data reception operations in parallel via a plurality of data communication lines. A mode selecting unit is used for a user to select one of a line specifying mode and a free-line searching mode. A line determining unit determines a transmission line from among the plurality of data communication lines, the transmission line being then used for performing a data transmission operation by the transmitting/receiving unit. The line determining unit determines the transmission line as being a line selected by a user from among the plurality of data communication lines when the line specifying mode is selected through the mode selecting unit. The line determining unit searches the plurality of data communication lines for a free one so as to determine the transmission line as being the free one when the free-line searching mode is selected through the mode selecting unit.

6 Claims, 2 Drawing Sheets

5,636,034

DATA TRANSMITTING/RECEIVING APPARATUS OPERATING IN A USER-SELECTED ONE OF A LINE SPECIFYING MODE AND A FREE-LINE SEARCHING MODE

BACKGROUND OF THE INVENTION

1. Field of the Invention

The present invention relates to a data transmitting/receiving apparatus such as a facsimile apparatus, and in detail, relates to a facsimile apparatus having a plurality of external telephone/communication lines connected to this apparatus which then may perform a plurality of facsimile transmission/reception operations in parallel.

2. Prior Art

There is a facsimile apparatus, produced by Ricoh Company, Ltd., a brand name of which is REFAX No. D-7700. This facsimile apparatus has an ISDN line and a general analog line such as an NTT telephone line connected to this apparatus which then may perform a plurality of facsimile transmission/reception operations in parallel. An operator may perform a G3 facsimile data transmission operation through the general analog line and also perform a G4 facsimile data transmission operation through the ISDN line at the same time to two different destinations.

In this facsimile apparatus, if one of the two lines is busy, that is, for example, if the analog line of the ISDN line and the general analog line are currently busy for the G3 facsimile operation, the operator may use the remaining ISDN line for the G4 facsimile operation. However, if the operator wishes to perform two different G3 facsimile operations, because the ISDN line cannot be used for the G3 facsimile operation, the operator can perform only one of these two G3 facsimile operations at a time. Therefore, only after the one of the G3 facsimile operations has been finished, the remaining one of the G3 facsimile operations can be performed.

SUMMARY OF THE INVENTION

An object of the present invention is to provide a data transmitting/receiving apparatus such as a facsimile apparatus having a plurality of communication/telephone lines connected thereto, wherein a plurality of facsimile operations of the same type such as G3 or G4 can be performed at the same time through the plurality of communication/telephone lines.

A data transmitting/receiving apparatus according to the present invention comprises:

transmitting/receiving means for performing a plurality of data transmission operations and data reception operations in parallel via a plurality of data communication lines;

mode selecting means for a user to select one of a line specifying mode and a free-line searching mode;

line determining means for determining a transmission line from among the plurality of data communication lines, the transmission line being then used for performing a data transmission operation by the transmitting/receiving means;

and wherein:

the line determining means determines the transmission line as being a line selected by a user from among the plurality of data communication lines when the line specifying mode is selected through the mode selecting means; and the line determining means searches the plurality of data communication lines for a free one so as to determine the transmission line as being the free one when the free line searching mode is selected through the mode selecting means.

By the mode selecting means, the user can select the line specifying mode or the free-line searching means for each occasion of facsimile transmission. Therefore, if the user wishes to use a particular line among the plurality of data communication lines connected to the data transmitting/receiving apparatus for some reason such as cost reduction, the user may select the line specifying mode. However, if the particular line is busy before performing a relevant facsimile transmission, the user must wait until the line becomes free.

If the user wished to perform facsimile transmission as soon as possible, the user may select the free-line searching mode. Then, the line determining means automatically searches the plurality of data communication lines for a free line. Thus, if there is a free line among the plurality of data communication lines, it is not necessary for the user to wait before performing the relevant data transmission.

Further, it is preferable that the data transmitting/receiving apparatus includes order specifying means for the user to specify an order according to which the line determining means searches the plurality of data communication lines for a free one so as to determine the transmission line as being the free one when the free-line searching mode is selected through the mode selecting means. The order is an order in which:

a representing line predetermined from among the plurality of data communication lines is searched later, a telephone number of the representing line being used as a telephone number representing the data transmission/reception apparatus; and a line having a larger telephone number is searched earlier.

As a result, it is possible to search the plurality of data communication lines from lines which are likely to be free. Thus, it is possible to obtain a free line sooner.

Further, it is preferable that the data transmitting/receiving apparatus includes data storing means for temporarily storing data to be transmitted to other data transmitting/receiving apparatuses and data received from other transmitting/receiving apparatuses. By using the data storing means, parallel simultaneous performing of a plurality of data transmission/reception operations can be achieved even if the apparatus does not have a function of parallel simultaneous performing of a plurality of data outputting operations nor a function of parallel simultaneous performing of a plurality of data inputting operations.

In fact, the user may use the data storing means for temporarily storing data to be transmitted when all the lines are busy. Then, after one of the lines is free, this line is used to transmit the thus-stored data. The data storing means may also be used for temporarily storing currently received data when the outputting function is busy printing out data also currently being received via a different line. After the outputting function is free, this function is used for outputting the thus-stored data.

Other objects and further features of the present invention will become more apparent from the following detailed description when read in conjunction with the accompanying drawings.

DESCRIPTION OF THE PREFERRED EMBODIMENT

Figure 1:
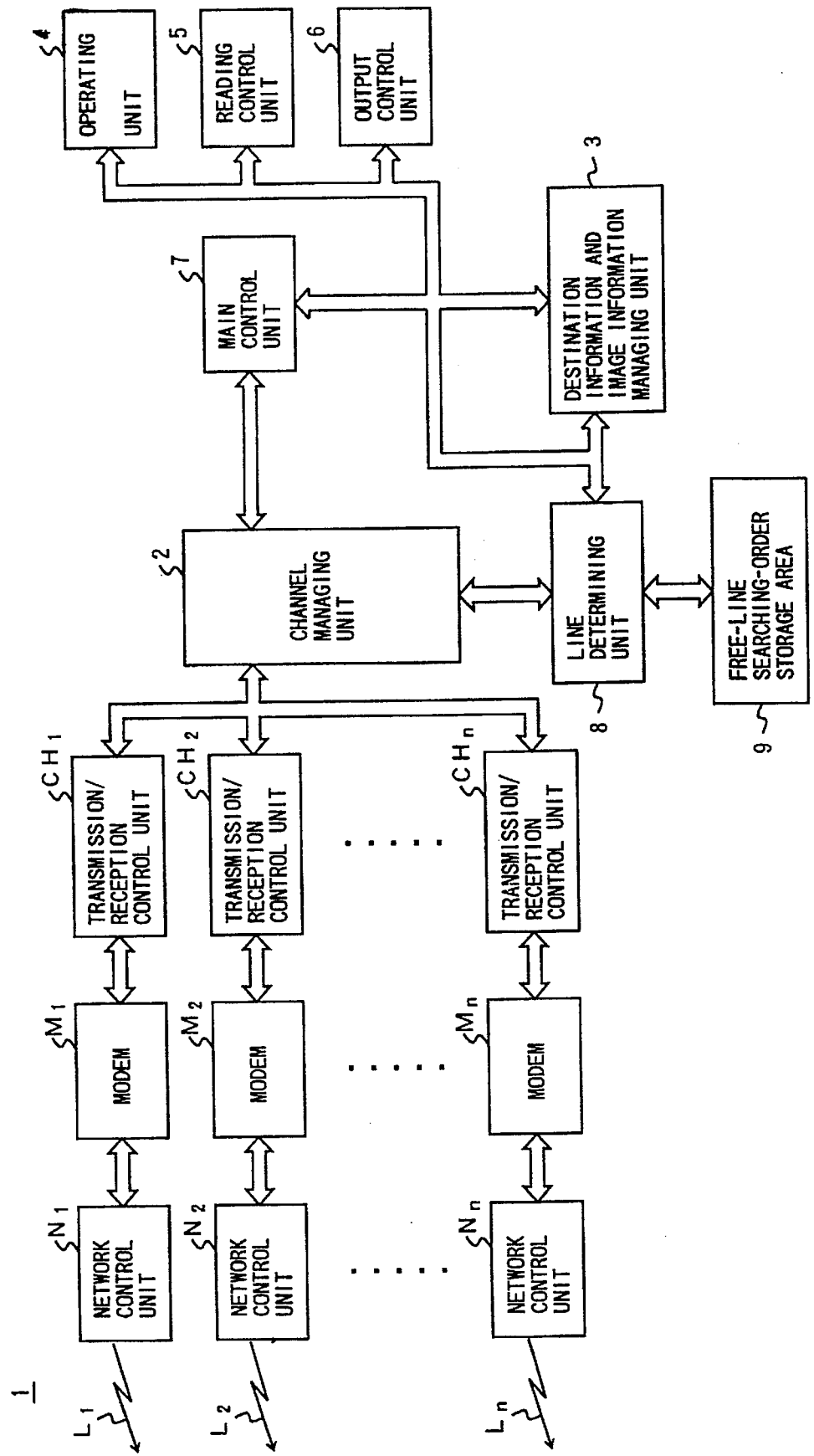
FIG. 1 shows a block diagram of a facsimile apparatus in one embodiment of the present invention.
Figure 2:
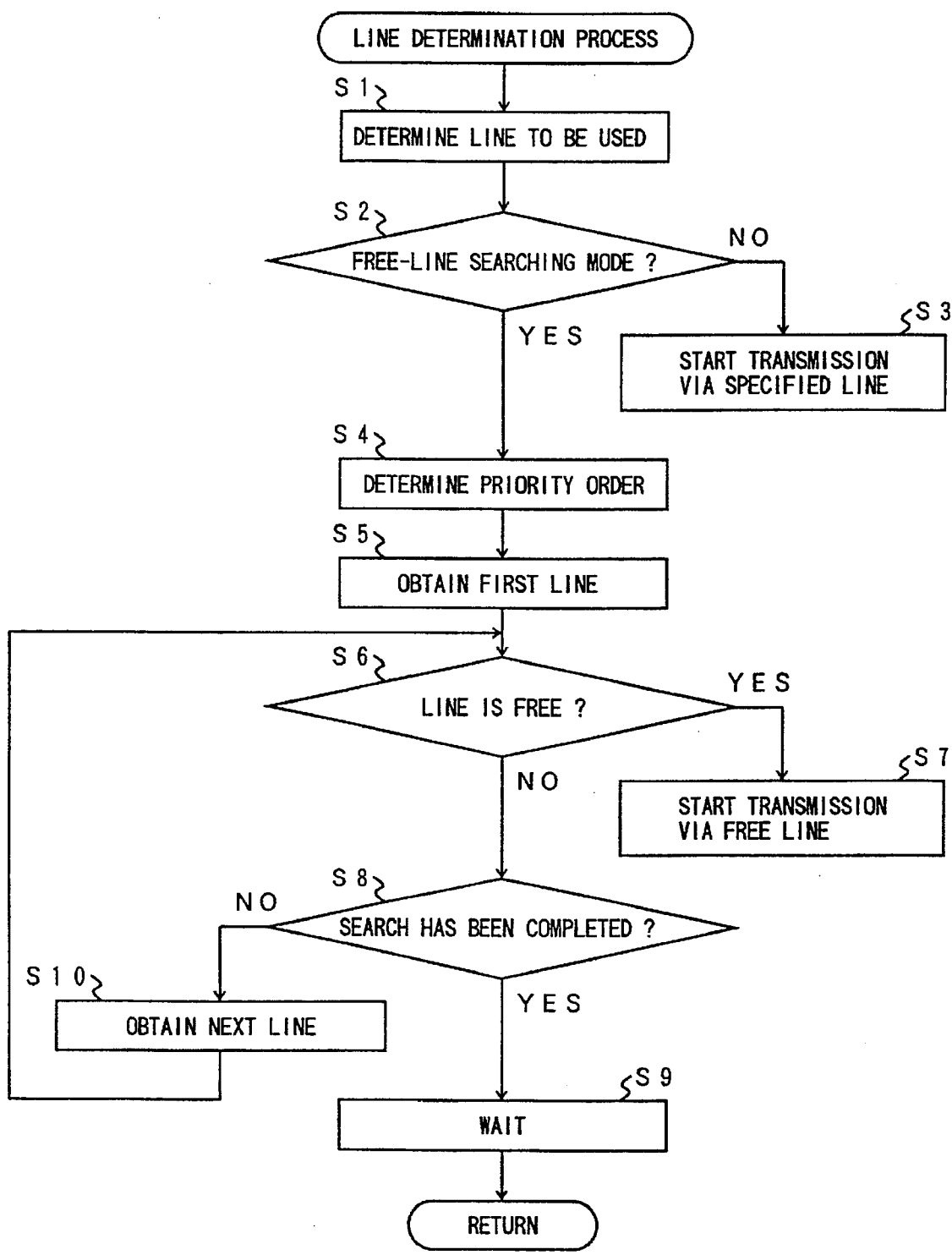
FIG. 2 shows an operation flowchart for determining a line to be used for transmitting an image signal in the apparatus shown in FIG. 1.

With reference to FIGS. 1 and 2, a facsimile apparatus in an embodiment of the present invention will now be described.

As shown in FIG. 1, the facsimile apparatus 1 includes network control units $N_1$ through $N_n$, modems $M_1$ through $M_n$, transmission/reception control units $CH_1$ through $CH_n$, a channel managing unit 2, a destination information and image information managing unit (hereinafter will be referred to as a various information managing unit) 3, an operating unit 4, a reading control unit 5, an output control unit 6, a main control unit 7, a line determining unit 8, and a free-line searching-order storage area 9.

The network control units $N_1$ through $N_n$ are connected to external communication/telephone lines $L_1$ through $L_n$ respectively. These external communication/telephone lines are those of any ones of ordinary public analog telephone networks such as NTT, KDD and so forth and digital communications networks such as ISDN. The network control units $N_1$ through $N_n$ perform automatic calling on other facsimile apparatuses connected to the communication/telephone networks, in which the above-mentioned external lines $L_1$ through $L_n$ are included. The network control units $N_1$ through $N_n$ also performs automatic accepting of calls sent from other facsimile apparatuses connected to the communication/telephone networks, in which the above-mentioned external communication/telephone lines $L_1$ through $L_n$ are included.

The modems $M_1$ through $M_n$ modulate image signals to be transmitted into forms appropriate to data transmission via the external communication/telephone lines $L_1$ through $L_n$, respectively. Further, the modems $M_1$ through $M_n$ demodulate received image signals which are modulated and then transmitted from other facsimile apparatuses via the external communication/telephone lines $L_1$ through $L_n$, respectively.

Before the facsimile apparatus 1 transmits/receives image signals to/from other facsimile apparatuses via the external communication/telephone lines $L_1$ through $L_n$, respectively, the transmission/reception control units $CH_1$ through $CH_n$ transmit/receive control signals to/from the other facsimile apparatuses via the external communication/telephone lines $L_1$ through $L_n$, respectively. Thus, the transmission/reception control units $CH_1$ through $CH_n$ set communication functions and/or transmit/receive various sorts of control information, and thus perform facsimile control procedures so as to transmit/receive the image signals. Further, the transmission/reception control units $CH_1$ through $CH_n$ have a function of compressing image information before transmitting it and a function of reproducing received image information.

The channel managing unit 2 operates under control of the main control unit 7, and manages data transfer between the main control unit 7 and the transmission reception control units $CH_1$ through $CH_n$. Specifically, when the facsimile apparatus 1 receives/transmits facsimile data from/to another facsimile apparatus, the channel managing unit 2 enables the data communication via a relevant series of external communication/telephone line, network control unit, modem and transmission/reception control unit shown in FIG. 1 by selecting the relevant series.

The various information managing unit 3 manages information indicating destinations to which image signals are transmitted, image information to be transmitted, and received image information. Further, the managing unit 3 has a function of temporarily storing image information to be transmitted and received image information.

The operating unit 4 is provided with a power switch, character keys, function keys and so forth. The user can input various instructions such as transmission instructions to the facsimile apparatus 1 by pressing these various keys. The operating unit 4 is further provided with a selecting switch through which the user can select one of a line specifying mode and a free-line searching mode. Information indicating a mode of the line specifying mode and the free-line searching mode selected through the selecting switch is input to the various information managing unit 3 as one item of the information of destinations.

The operating unit 4 is further provided with an order specifying switch through which the user can specify a priority order according to which the external communication/telephone lines $L_1$ through $L_n$ are searched for a free line when the free-line searching mode is selected through the selecting switch.

An image scanner using a charge-coupled device is, for example, used as the reading control unit 5 which scans an original image to be transmitted and reads image information thereof.

A thermal printing device using a thermal element is, for example, used as the output control unit 6 which prints out received image information either directly onto a heat-sensitive recording paper sheet or via an ink sheet onto an ordinary recording paper sheet.

The main control unit 7 includes a central processing unit (hereinafter, will be referred to as a CPU), a random access memory (hereinafter, will be referred to as a RAM), a read-only memory (hereinafter, will be referred to as a ROM) and so forth. The ROM stores basic programs and so forth according to which the CPU causes the facsimile apparatus 1 to perform sequences as those of a facsimile apparatus as a result of controlling various units in the facsimile apparatus 1.

The line determining unit 8, prior to the facsimile apparatus 1 actually performing a transmission operation, reads the above-mentioned information indicating a mode of the line specifying mode and the free-line searching mode from the various information managing unit 3. If the thus-read information indicates the line specifying mode, the line determining unit 8 outputs a signal to the channel managing unit 2 such that the channel managing unit 2 selects a relevant series of network control unit, modem and transmission/reception control unit for performing data transfer between a specified line and the main control unit 7. This specified line is a line which is specified by the user from among the external communication/telephone lines $L_1$ through $L_n$ through the operating unit 4.

If the read information indicates the free-line searching mode, the line determining unit 8 refers to a free-line searching-order storage area 9. Then, the unit 8 searches, for a free line, the external communication/telephone lines $L_1$ through $L_n$ according to the above-mentioned priority order previously stored in the free-line searching-order storage area 9.

The free-line searching-order storage area 9 previously stores therein the priority order through the order specifying switch as mentioned above. Through the order specifying switch, the priority order previously stored in the free-line searching-order storage area 9 may be changed if necessary.

How to determine the above-mentioned priority order will now be described. A case will be supposed in which the external communication/telephone line $L_1$ is a line of the KDD public telephone network, for example, and the remaining lines $L_2$ through $L_n$ are lines of the NTT public telephone network, for example. Further, a telephone number indicating the line $L_2$ is used as a telephone number representing the facsimile apparatus 1 and thus only the representing telephone number is indicated externally. The line $L_1$ is particularly used as a line through which facsimile transmission/reception is performed with other facsimile apparatuses located in foreign countries. The line $L_2$ is particularly used as a receiving line through which image signals are received from another facsimile apparatus. The remaining lines $L_3$ through $L_n$ are particularly used as lines through which image signals are transmitted to another facsimile apparatus.

In this case, the priority order among the external communication/telephone lines $L_1$ through $L_n$ may be determined as follows: First, the lines $L_3$ through $L_n$ are searched. Further, among these lines, a line having a larger telephone number is searched earlier. For example, a case is supposed in which the lines $L_3$ through $L_n$ are lines $L_3$, $L_4$, and $L_5$, which have telephone numbers "1111", "1112", and "1113", respectively. In this case, the priority order may be "$L_5$, $L_4$, $L_3$". This is because a switchboard of a public telephone network such as the NTT automatically searches lines for a free line in an order in which a line having a smaller telephone number is searched earlier. That is, the switchboard first obtains a line having the above-mentioned telephone number representing the facsimile apparatus 1 among the lines $L_1$ through $L_n$ so as to use this line for delivering data to the facsimile apparatus 1 from another facsimile apparatus. If this line is busy, the switchboard then obtains a line, among the remaining lines, having the smallest telephone number. If this line is also busy, the switchboard then obtains a line having the telephone number subsequent to that smallest one.

As a result, it is likely that lines having smaller telephone numbers are used for receiving image signals from other facsimile apparatuses. Accordingly, it is likely that lines having larger telephone numbers are not busy. Therefore, when a facsimile transmission is performed to another facsimile apparatus, it is likely that a free line can be found earlier when a search is performed in an order in which a line having a larger telephone number is searched earlier.

Further, an order, according to which the lines $L_3$ through $L_n$, other than the line $L_2$ having the telephone number representing the facsimile apparatus 1, are searched first, may be used as mentioned above. Thereby, because it is not likely that all of those lines $L_2$ through $L_n$ are busy in facsimile reception, it is likely that a free line can be found earlier when a search is performed in this order.

With reference to FIG. 2, a method for retrieving a line to be used for transmitting image data from among the external communication/telephone lines $L_1$ through $L_n$ will now be described. This method shown in the figure is performed by the main control unit 7 shown in FIG. 1.

Prior to each occasion of transmitting image information to another facsimile apparatus, a user presses the selecting switch of the operating unit 4 so as to specify one of the line specifying mode or the free-line searching mode. Further, if the user selects the line specifying mode, the user further selects one of the external communication/telephone lines $L_1$ through $L_n$ by pressing relevant keys provided on the operating unit 4. Further, the user also inputs a telephone number of the above-mentioned other facsimile apparatus by pressing relevant keys provided on the operating unit 4. The thus-input information is first input to the various information managing unit 3.

Under the control of the main control unit 7, the line determining unit 8 obtains information indicating the above-selected one of the line specifying mode and the free-line searching mode in a step S1 (the term "step" will be omitted, hereinafter) from the various information managing unit 3. Thus, the line determining unit 8 determines the selected mode in S2.

If the selected mode is the line specifying mode, the line determining unit 8 sends a signal to the various information managing unit 3 such that the various information managing unit 3 sends information indicating the above-selected one of the external communication/telephone lines $L_1$ through $L_n$ to the channel control unit 2. In response to this, the channel control unit 2 selects a relevant series of network control unit, modem and transmission/reception control unit for performing data transfer between the above-selected external line and the main control unit 7. Then, the main control unit 7 starts relevant facsimile transmission using this external line in S3.

If the line determining unit 8 determines that the selected mode is the free-line searching mode in S2, the unit 8 refers to the free-line searching order storage area 9. Thus, the line determining unit 8 obtains the priority order previously stored in the storage area 9 by the user. Then, the determining unit 8 obtains the first line from among the external communication/telephone lines $L_1$ through $L_n$ in accordance with the thus-obtained priority order in S5. Then, the determining unit 8 determines in S6 whether or not the thus-obtained line is busy. If it is determined in S6 that the line is not busy, the channel control unit 2 selects a relevant series of network control unit, modem and transmission/reception control unit for performing data transfer between the main control unit 7 and the thus-obtained line. Then, the main control unit 7 starts relevant facsimile transmission using this line in S7.

If the determining unit 8 determines in S6 that the obtained line is busy, the determining unit 8 determines in S8 whether or not a search of the external communication/telephone lines $L_1$ through $L_n$ for a free line has been completed. If it is determined in S8 that the search has been completed, the facsimile apparatus 1 enters a transmission waiting state in S9.

If the determining unit 8 determines in S8 that the search has not yet been completed, the determining unit 8 obtains in S10 a subsequent line from among the external communication/telephone lines $L_1$ through $L_n$ according to the priority order determined in S4. Then, a loop of S6, S8 and S10 is repeated until either a result of S6 is YES or a result of S8 is YES.

The above-described sequence of operations is performed for each facsimile transmission operation.

Thus, in the above-described embodiment, if the line specifying mode is selected, a line specified by a user is used. If the free line searching mode is selected, all the lines connected to the facsimile apparatus are searched for a free line in the priority order previously specified by the user. Therefore, if the user wishes to specify a particular line from among all the connected lines, the user may select the line specifying mode.

For example, in the above-mentioned case, the external communication/telephone line $L_1$ is a line of the KDD public telephone network for example and the remaining lines $L_2$ through $L_n$ are lines of the NTT public telephone network. In this case, if the user wishes to transmit an image signal to another facsimile apparatus located in a foreign country, the user may select the line specifying mode and specify the line $L_1$ if costs required for such foreign country facsimile transmission are cheaper using KDD than using NTT. Thus, the relevant facsimile transmission is performed using the KDD network and thus it may be possible to effectively reduce costs required for such foreign country facsimile transmission.

However, in the above-mentioned example, if the line $L_1$ is busy for another facsimile transmission/reception and the user wishes to perform the relevant facsimile transmission urgently, the user may select the free-line searching mode. Thus, it is possible to obtain a free line earlier and thus perform the relevant facsimile transmission earlier.

Further, it is also possible to use lines of various public telephone networks as the external communication/telephone lines $L_1$ through $L_n$, these various networks having particular characteristics with regard to facsimile transmission costs. For example, one network may be advantageous for a particular area in a country. Therefore, the user may effectively reduce the costs by appropriately selecting public telephone networks depending on areas to which image signals are transmitted. By selecting the line specifying mode in the above-mentioned embodiment of the present invention, it is possible to effectively reduce the costs by appropriately selecting public telephone networks. If the user wishes to transmit an image signal urgently regardless of the costs, the user may select the free-line searching mode. Thus, as mentioned above, it is possible to obtain a free line earlier and thus perform the relevant facsimile transmission earlier.

Thus, because the above-mentioned mode selection can be performed for each occasion of facsimile transmission in the embodiment, it is possible to perform the facsimile transmission in a condition matching the user's demand.

Further, the priority order stored in the free-line searching-order storage area 9 can be changed by pressing keys on the operating unit 4. Therefore, if which communication/telephone network is used as each line of the external communication/telephone lines $L_1$ through $L_n$ is changed, or if a telephone number of a line used as a telephone number representing the facsimile apparatus is changed among those lines, the user may change the priority order so as to make it match the current state as described above.

Further, the various information managing unit 3 of the facsimile apparatus 1 has the function of temporarily storing image information to be transmitted and received image information as mentioned above. Therefore, the facsimile apparatus 1 can perform a plurality of facsimile transmission operations/reception operations in parallel even if the facsimile apparatus 1 does not have a function of performing a plurality of original image reading operations/received image printing operations in parallel.

In fact, the function of the various information managing unit 3 may be used for temporarily storing image information to be transmitted when all the lines $L_1$ through $L_n$ are busy. Then, after one of the lines is free, this line is used to transmit the thus-stored image information. The function of the various information managing unit 3 may also be used for temporarily storing currently received image information when the function of a received-image printing operation is busy printing out image information also currently being receiving via a different line. After the image printing function is free, this function is used for printing out the thus-stored image information.

Further, communication/telephone lines to which the facsimile apparatus according to the present invention is connected are not limited to public telephone networks such as the NTT, KDD and so forth. It is also possible to that the facsimile apparatus according to the present invention has functions as a G4 facsimile machine and is connected to digital communications networks such as ISDN.

Further, the present invention is not limited to such a facsimile apparatus handling image signals. The present invention can be applied to other sorts of data transmitting/receiving apparatuses handling other sorts of signals.

The present invention is not limited to the above-described embodiment, and variations and modifications may be made without departing from the scope of the present invention.

What is claimed is:

1. A data transmitting/receiving apparatus comprising:

transmitting/receiving means for performing a plurality of data transmission operations and data reception operations in parallel via a plurality of data communication lines;

mode select means for a user to select one of a line specifying mode and a free-line searching mode;

line determining means for determining a transmission line from among said plurality of data communication lines without regard to a destination of a destination apparatus connectable to the determined transmission line, said transmission line being then used for performing a data transmission operation by said transmitting/receiving means with the destination apparatus; and wherein:

said line determining means determines said transmission line as being a line selected by a user from among said plurality of data communication lines when said line specifying mode is selected through said mode selecting means; and said line determining means searches said plurality of data communication lines for a free one, and searches without regard to the destination of the destination apparatus so as to determine said transmission line as being said free one when said free-line searching mode is selected through said mode selecting means.

2. The data transmitting/receiving apparatus according to claim 1, wherein said plurality of data communication lines includes a plurality of lines of the same data communication network.

3. The data transmitting/receiving apparatus according to claim 1, further comprising data storing means for storing data to be transmitted to other data transmitting/receiving apparatuses and data received from other transmitting/receiving apparatuses.

4. The data transmitting/receiving apparatus, according to claim 1, wherein said data transmission operations and data reception operations comprise facsimile transmission/reception operations.

5. A data transmitting/receiving apparatus comprising:

transmitting/receiving means for performing a plurality of data transmission operations and data reception operations in parallel via a plurality of data communication lines;

mode select means for a user to select one of a line specifying mode and a free-line searching mode;

line determining means for determining a transmission line from among said plurality of data communication lines, said transmission line being then used for performing a data transmission operation by said transmitting/receiving means;

and wherein:

said line determining means determines said transmission line as being a line selected by a user from among said plurality of data communication lines when said line specifying mode is selected through said mode selecting means;

said line determining means searches said plurality of data communication lines for a free one so as to determine said transmission line as being said free one when said free-line searching mode is selected through said mode selecting means; and order specifying means for the user to specify an order according to which said line determining means searches said plurality of data communication lines for a free one so as to determine said transmission line as being said free one when said free-line searching mode is selected through said mode selecting means.

6. The data transmitting/receiving apparatus according to claim 5, wherein said order is an order in which:

a representing line predetermined from among said plurality of data communication lines is searched later, a telephone number of said representing line being used as a telephone number representing said data transmission/reception apparatus; and a line having a larger telephone number is searched earlier.

* * * * *